United States Patent
Spykerman et al.

(10) Patent No.: US 6,375,055 B1
(45) Date of Patent: Apr. 23, 2002

(54) COLLAPSIBLE AND REMOVABLE CARGO MANAGING SYSTEM AND AUXILIARY SUPPORT TABLE

(75) Inventors: David J. Spykerman, Zeeland; Shelle Dawn Tilstra, Byron Center, both of MI (US)

(73) Assignee: Johnson Controls Technology Company, Plymouth, MI (US)

( * ) Notice: Subject to any disclaimer, the term of this patent is extended or adjusted under 35 U.S.C. 154(b) by 0 days.

(21) Appl. No.: 09/566,038

(22) Filed: May 6, 2000

Related U.S. Application Data

(60) Provisional application No. 60/133,157, filed on May 7, 1999.

(51) Int. Cl.[7] ............................................. B60R 7/02
(52) U.S. Cl. ........................ 224/542; 108/12; 108/14; 220/6; 224/925; 280/30; 280/639
(58) Field of Search ................................ 224/539, 542, 224/925; 220/6, 756, 757; 108/11, 12, 14; 280/30, 639, 37

(56) References Cited

U.S. PATENT DOCUMENTS

| | | | | |
|---|---|---|---|---|
| 1,938,509 A | * | 12/1933 | Bailey | 220/6 |
| 2,611,417 A | * | 9/1952 | Henry et al. | 220/6 |
| 2,829,705 A | * | 4/1958 | Godshalk et al. | 220/6 |
| 3,058,445 A | * | 10/1962 | Johnson | 220/6 |
| 3,311,254 A | * | 3/1967 | Beh | 220/6 |
| 3,865,269 A | * | 2/1975 | Coleman | 220/6 |
| 3,967,562 A | * | 7/1976 | Anacker | 108/12 |
| 4,538,737 A | * | 9/1985 | Delaney | 211/71 |
| 4,583,467 A | * | 4/1986 | Tiffany | 108/19 |
| 5,092,615 A | * | 3/1992 | Gregalis | 280/30 |
| 5,201,536 A | * | 4/1993 | Bono et al. | 280/30 |
| 5,285,656 A | * | 2/1994 | Peters | 280/30 |
| 5,535,931 A | * | 7/1996 | Barlow et al. | 224/404 |
| 5,653,457 A | * | 8/1997 | Marmer et al. | 280/30 |
| 5,669,537 A | * | 9/1997 | Saleem et al. | 224/539 |
| 5,839,738 A | * | 11/1998 | Ozark | 280/30 |
| 5,857,695 A | * | 1/1999 | Crowell | 280/30 |
| 6,015,071 A | * | 1/2000 | Adomeit et al. | 220/6 |
| 6,026,646 A | * | 2/2000 | Hansen et al. | 220/6 |
| 6,152,462 A | * | 11/2000 | Barrett | 280/30 |

* cited by examiner

*Primary Examiner*—Stephen P. Garbe
(74) *Attorney, Agent, or Firm*—Foley & Lardner

(57) ABSTRACT

A cargo management and restraining apparatus for use in a cargo area of a vehicle, which is also removable from the vehicle and useable as a free standing support surface such as a table. The apparatus includes a base and a pair of pivotably mounted end walls. The base fits within a recess formed within a floor of a cargo area of a vehicle. Cargo may be placed on the base and the end walls help to keep the cargo from moving or shifting during use of the vehicle. The end walls may be folded down against the base when the apparatus is not needed so as not to interfere with the placement of large cargo items in the cargo area. The apparatus can be completely removed from the vehicle and used as a free standing support surface such as a table. A plurality of wheels are included in one preferred embodiment to enable the apparatus to be used as a cart to move cumbersome or heavy items such as a thermal cooler. Another preferred embodiment incorporates a removable planar-like partition which is supported by a pair of support arms above a floor of a cargo area. The support arms are pivotably attached to interior wall portions of the cargo area and positionable in generally horizontal, extended positions. The partition is slid inbetween the outermost ends of the support arms so as to be supported above the floor of the cargo area. In this manner the partition forms an auxiliary support shelf to increase the effective floor area of the cargo area.

20 Claims, 4 Drawing Sheets

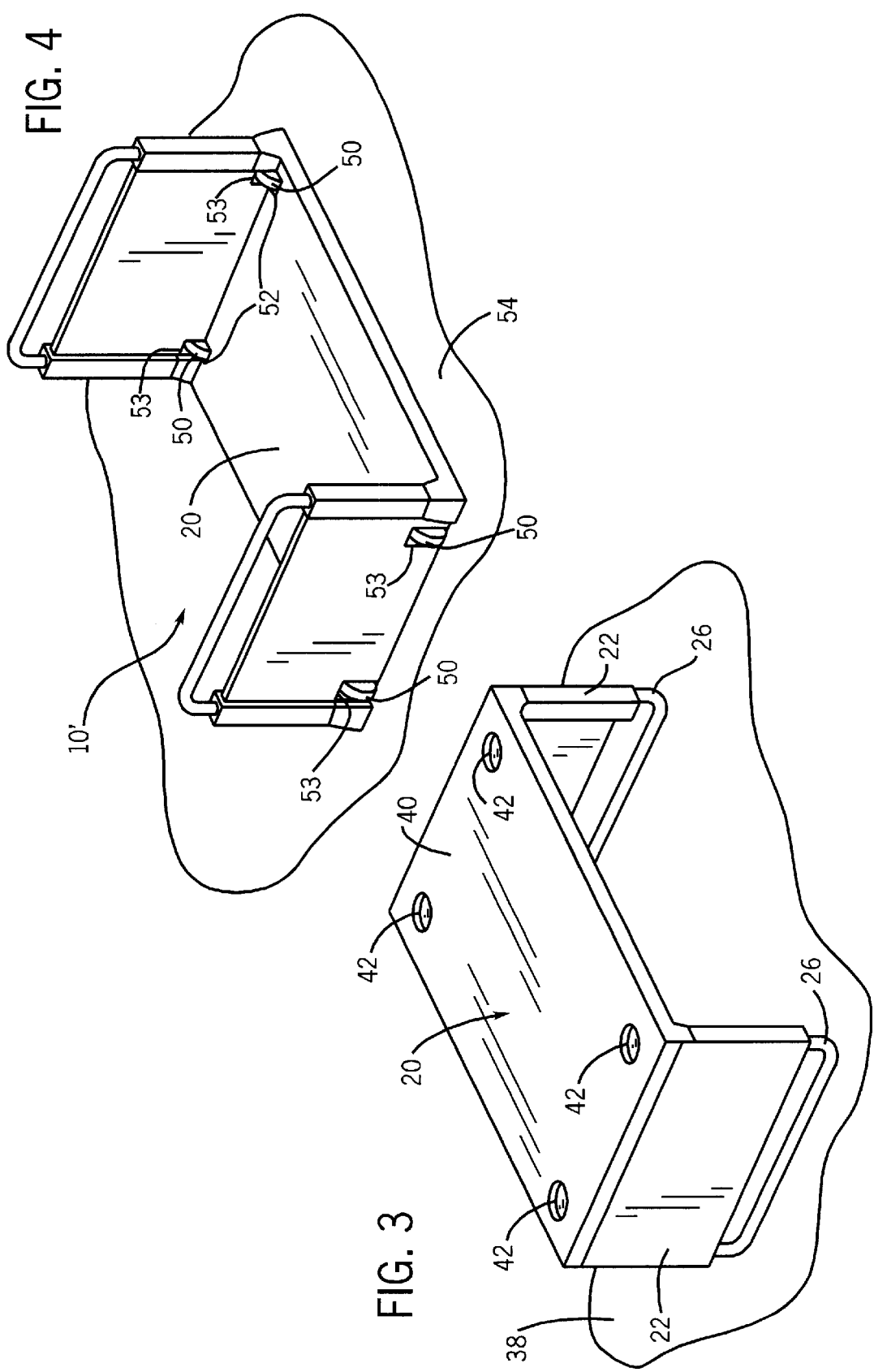

COLLAPSIBLE AND REMOVABLE CARGO MANAGING SYSTEM AND AUXILIARY SUPPORT TABLE

This application claims benefit of Provisional Application No. 60/133,157, filed May 7, 1999.

BACKGROUND OF THE INVENTION

This invention relates to cargo restraint and management systems, and more particularly to a removable cargo management and restraining system adapted to be disposed within a recess formed in an interior floor portion of a cargo area of a motor vehicle, where the cargo management system is able to function as a free standing table when removed from the vehicle.

Cargo restraint and management systems are often helpful for managing and restraining loads of various sizes and shapes within a cargo area of a motor vehicle such as, but not limited to, a van or sport utility vehicle. Such systems can help to prevent packages of various sizes from moving around within the cargo area during use of the vehicle and/or to help maintain variously sized cargo items in an upright orientation.

Previously developed cargo management and restraining systems have employed one or more partitions that can be positioned within the cargo area of a vehicle in such a manner as to define an area within which the cargo can be placed. However, such systems have not been able to perform any auxiliary function besides the primary function of helping to secure cargo in a desired arrangement within the cargo area of the vehicle. Furthermore, many such existing cargo management systems occupy valuable storage space within the vehicle's cargo area even when not in use.

It is therefore a principal object of the present invention to provide a cargo management system which is capable of being removed from the cargo area of a vehicle and used as an auxiliary support surface such as a free standing table. It is a further object to provide such a combined cargo management/auxiliary support surface which can be compactly collapsed for storage within a suitably sized recessed area in the floor of the vehicle's cargo area so as not to occupy valuable interior cargo space when not in use.

It is yet another object to provide a cargo management system which is strong and sturdy yet very light in weight so as to be easily lifted by an individual out of a recessed area in a floor of a cargo area of a vehicle, and also quickly and easily collapsed into a storage position within the recessed area without the need of any tools.

SUMMARY OF THE INVENTION

The present invention provides a cargo management apparatus for managing and restraining cargo within a cargo area of a vehicle which can also function as a free standing support surface such as a table. The apparatus includes a base and a pair of pivotably attached end walls. When in a folded orientation, the base and end walls may be entirely disposed within a suitably sized recess in a floor of a cargo area of a vehicle. In this manner, the apparatus does not occupy valuable interior storage area within the cargo area.

When the apparatus is used as a cargo management and restraining system, the end walls are folded outwardly to project upwardly from the floor of the cargo area. Other implements such as one or more elastic nets may be secured to the end walls to further help restrain cargo in a desired orientation.

When it is desired to use the apparatus as a free standing support surface such as a table, the entire apparatus is lifted out of the recess and the end walls are pivoted out into their extended positions. The apparatus can be rested on the end walls with the base functioning as a table surface.

In an alternative preferred embodiment, the apparatus includes a plurality of wheels operatively associated with the base. In addition to being useable as a free standing support surface such as a table when in the unfolded orientation, the wheels enable the apparatus to be easily moved along a ground surface while the base is used to support objects, such as a thermal cooler. In this manner, the apparatus can be used as a cart to transport objects which might be too cumbersome for an individual to carry.

In yet another alternative preferred embodiment, the apparatus of the present invention comprises a planar-like partition which may be stored within a recess in the floor of a vehicle's cargo area, and at least one secondary, foldably collapsible support arm secured to one vertical interior wall portion with the cargo area. When the support arm is in its extended position, it can be used to help support the partition in an elevated position above the floor of the cargo area. In this manner, the partition is able to form a shelf extending completely across the interior of the cargo area so that cargo can be placed on top of the partition as well as underneath it. Thus, the apparatus can be used to significantly increase the useable floor area of the cargo compartment.

BRIEF DESCRIPTION OF THE DRAWINGS

The various advantages of the present invention will become apparent to one skilled in the art by reading the following specification and by referencing the following drawings in which:

FIG. 3 is a perspective view of the apparatus of FIGS. 1 and 2 removed from the recess of the cargo area of the vehicle and in position to be used as a free standing table;

FIG. 4 is an alternative preferred embodiment of the present invention incorporating a plurality of wheels for enabling the entire apparatus to function as a cart for transporting cargo or other objects too cumbersome or heavy for an individual to carry.

DETAILED DESCRIPTION OF THE PREFERRED EMBODIMENTS

The following description of the preferred embodiment is merely exemplary in nature, and is in no way intended to limit the invention or its application or uses.

Figure 1:
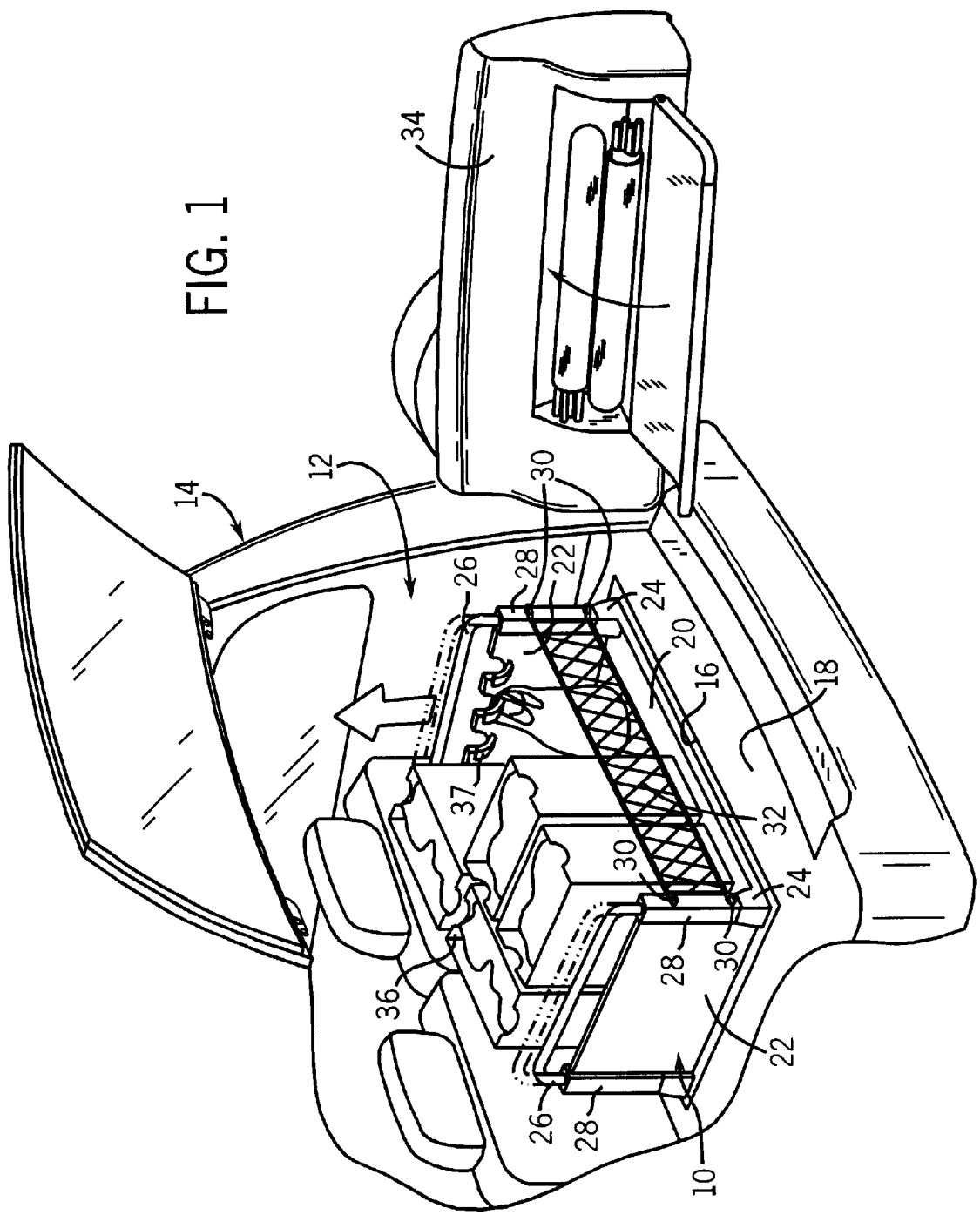
FIG. 1 is a perspective view of a rear portion of a motor vehicle illustrating a preferred embodiment of the present invention in position to perform a cargo managing and restraining function.

Referring to FIG. 1, a combined cargo management/auxiliary support apparatus 10 is shown in a cargo managing orientation within a cargo area 12 of a vehicle 14. While the vehicle 14 is illustrated as a sport utility vehicle or a van, it will be appreciated that the apparatus 10 could just as readily be disposed within a conventional trunk compartment of a passenger car or even within a bed of a pickup truck.

The apparatus 10 is disposed within a recess 16 formed in a floor 18 of the cargo area 12. The apparatus 10 generally comprises a base 20 and a pair of foldable end walls 22 secured at opposite ends of the base 20. The end walls 22 are pivotably attached by any suitable means at areas 24 such that they can be pivoted into upright positions as shown in FIG. 1. It will also be appreciated that any suitable structure may be included on the ends of the base 20 or on the end walls 22 to limit the outward pivoting movement of the end walls 22 to the positions shown in FIG. 1, and further to hold the end walls 22 in these positions until a suitable lateral force is applied to fold the end walls 22 back into a collapsed orientation. The collapsed (i.e., folded) orientation will be described below in connection with FIG. 2.

The base 20 may also be restrained within the recess 16 by any suitable means which permits a user to quickly free the base 20 from within the recess 16 when it is desired to remove the apparatus 10 from the vehicle 14 or to use it as a free standing table within the cargo area 12. Virtually any form of clasp, strap or other restraining element could be used to secure the base 20 within the recess 16. Alternatively, the apparatus 10 may be simply rested within the recess 16.

The end walls 22 also preferably include telescoping handles 26 partially, yet captively, disposed within outermost portions 28 of the end walls 22. The handles 26 can be fully extended to help restrain cargo which extends above the end walls 22. The handles 26 are shown in their completely extended positions in phantom in FIG. 1. The end walls 22 may also optionally, but preferably, include hooks 30 or other like members which enable a cargo net 32 to be secured between the end walls 22. The cargo net 32 prevents cargo 36 positioned on the apparatus 10 from tipping or falling out of the vehicle 14 when the rear hatch door 34 of the vehicle 14 is opened. The hooks 30 may be independent components or could even be integrally formed with the end walls 22. Optionally, one or more hooks 37 could be formed on one of the end walls 22 to support cargo items contained in plastic bags. The hooks 37 could, however, just as readily comprise independent elements that are secured to the end walls 22 by conventional fasteners.

Figure 2:
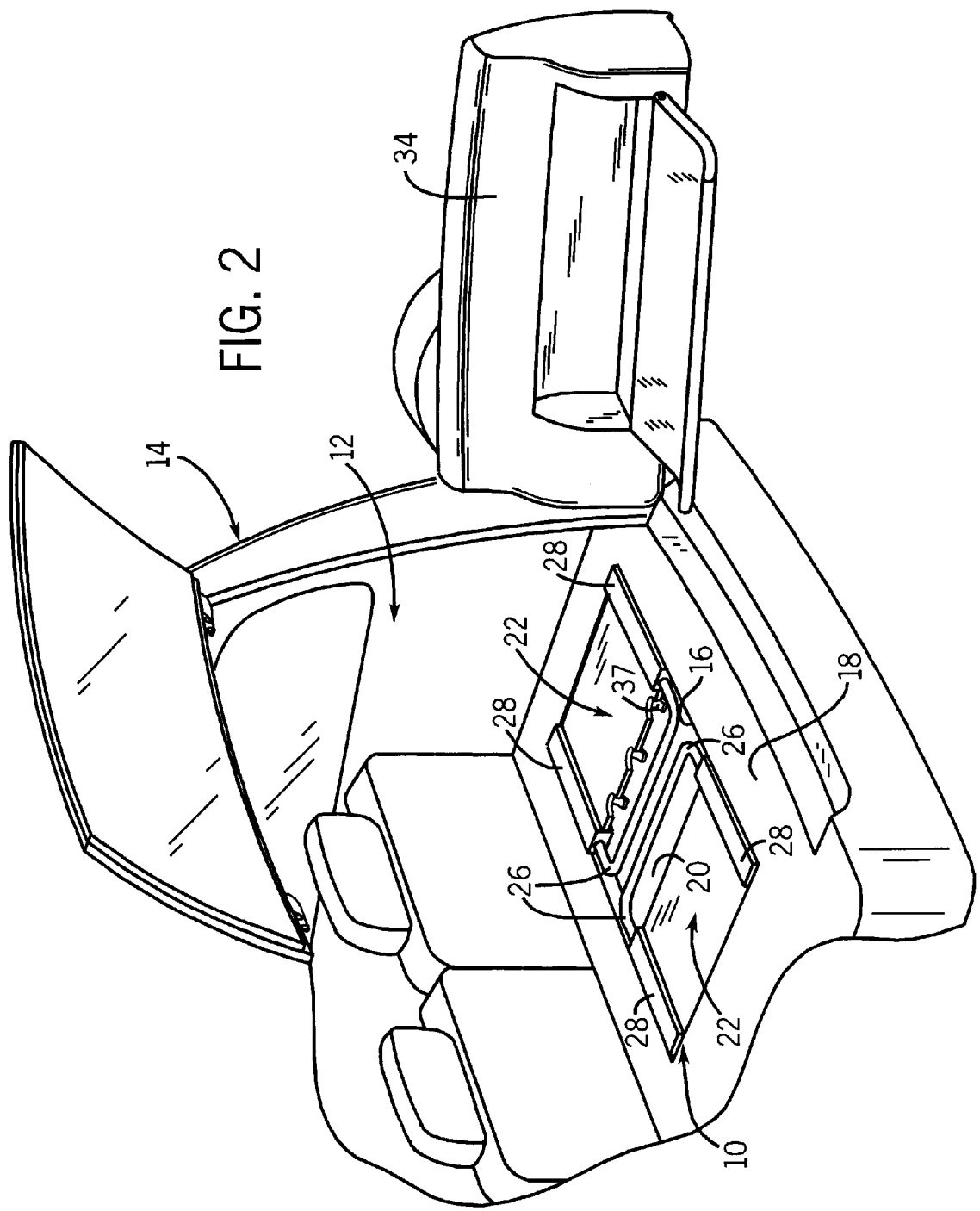
FIG. 2 is a perspective view of the cargo area of the vehicle of FIG. 1 with the apparatus of the present invention in a collapsed orientation within a recess formed in the floor of the cargo area.

Referring to FIG. 2, the apparatus 10 is illustrated with the end walls 22 foldably collapsed on the base 20. The handles 26 are also illustrated in their retracted positions. In this orientation, the apparatus 10 is able to rest entirely within the recess 16 such that the end walls 22 and handles 26 do not interfere with the placement of cargo on the floor 18 of the cargo area 12. Thus, the apparatus 10 does not occupy any valuable storage area within the cargo area 12 when it is not in use.

Referring now to FIG. 3, the apparatus 10 is shown removed from the vehicle 14 and positioned on a ground surface 38 to function as a free standing table or support surface. The base 20 has an undersurface 40 which may optionally include a plurality of integrally formed cup holder recesses 42, or simply openings sized to function as cup holders. The handles 26 and end walls 22 support the base 20 above the ground surface 38. Since the handles 26 can be telescopically extended from the end walls 22, the height of the base 20 relative to the ground surface 38 can also be easily adjusted when the apparatus 10 is used as a table. Just as easily, the apparatus 10 could be used as a free standing table positioned within the cargo area 12 of the vehicle 14.

The apparatus 10 can thus be used either within the vehicle 14 or outside of the vehicle for various recreational activities such as picnics, cookouts, etc., to support drinks, food or other items thereon.

Referring to FIG. 4, an alternative embodiment 10' of the apparatus of the present invention is illustrated. This embodiment is essentially identical to the apparatus 10 with the exception of four wheels 50 which have been added to the base 20. The wheels 50 are rotationally secured on suitable axles (not shown) at cutouts 52 in the base 20. Cutouts 53 provide clearance for the end walls 22. By disposing the wheels 50 within the cutouts 52 and 53, the overall footprint of the apparatus 10' is maintained the same or nearly the same as without the wheels 50. The wheels 50 provide the added advantage of enabling the apparatus 10' to be used as a cart to easily transport items which are too cumbersome or heavy for an individual to easily carry such as, for example, a thermal cooler. Any form of strap (not shown) may also be secured to one of the handles 26 to enable an individual to easily pull the apparatus 10' along a ground surface 54.

The base 20 and end walls 22 are preferably formed from a lightweight yet structurally strong material, for example, from high strength plastic. The handles 26 may also be formed from suitably strong plastic or from tubular lengths of metal. The apparatuses 10 and 10' are each extremely light in weight making it possible for an individual to easily lift either apparatus out of the recess 16 when the apparatus is to be used as a table. The removability of the apparatus 10 or 10' also permits it to be more easily washed or wiped clean if needed.

Figure 5:
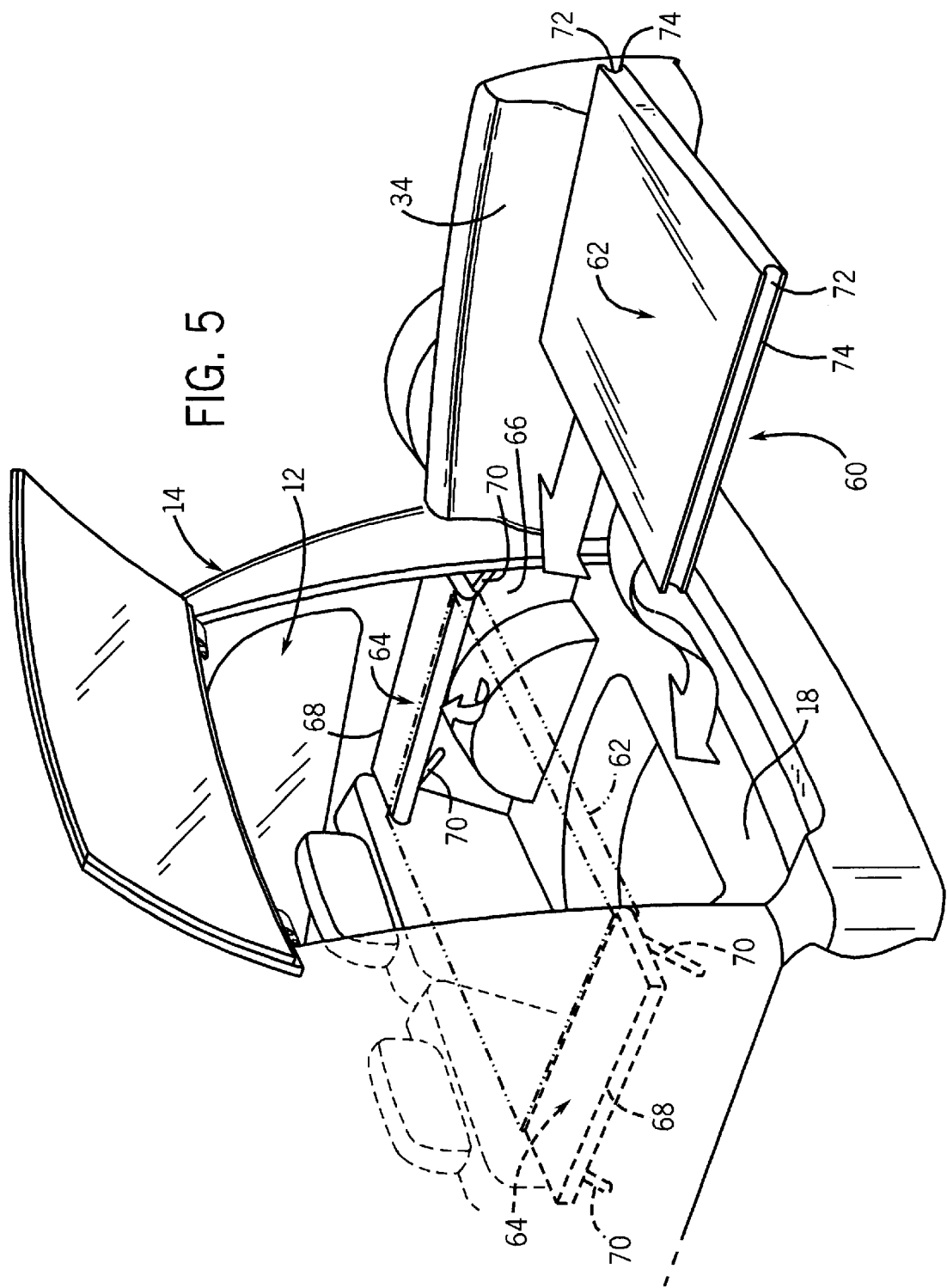
FIG. 5 is another alternative preferred embodiment of the present invention in which a planar-like partition is supported by at least one pivotably mounted support arm secured to an interior wall of the vehicle such that the partition forms a cargo supporting shelf within the cargo area of the vehicle.

Referring now to FIG. 5, still another cargo management/ restraining apparatus 60 is illustrated in accordance with another alternative preferred embodiment of the present invention. The apparatus 60 comprises a planar-like partition 62 and at least one support arm 64, and more preferably a pair of support arms 64. Each support arm 64 is pivotably attached to an interior wall portion 66 of the vehicle 14 at end 68 of the support arm 64 such that each can be folded down against its associated wall portion 66 when the partition 62 is not in use. Suitable support linkages 70 or other means are incorporated for holding the support arms 64 in their horizontally extended positions. Each support linkage 70 is preferably adapted to be manually released by a user without the need for any external tools. In this manner the support arms 64 can be quickly and easily extended or collapsed by the user as needed.

The partition 62 preferably comprises a single piece plastic component having channels or grooves 72 along its outermost opposing end portions 74. The support arms 64 have thicknesses or at least edge portions which are dimensioned so as to be received within the grooves 72 when the partition 62 is slidably inserted between the support arms 64. When fully slidably inserted, as indicated in phantom in FIG. 5, the partition 62 forms a generally horizontal, planar member which can be used as a supplemental support shelf to increase the effective floor area of the cargo area 12 of the vehicle 14.

The partition 62 and each of the support arms 64 may be formed from a variety of materials such as high strength plastics. The partition 62 is sufficiently light such that a single individual can easily lift it and slide it inbetween the support arms 64. The overall dimensions of the partition 62 are also such that it can be rested flat on the floor 18 of the cargo area 12 of the vehicle 14 when not in use or, alternatively, it can be disposed in a suitably shaped recess in the floor 18.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and following claims.

We claim:

1. A collapsible cargo management system for a vehicle interior cargo area having a floor with a recess for reception of the cargo management system, said cargo management system comprising:

a base configured to be supported by a bottom surface of the recess;

a first end wall pivotally supported relative to said base adjacent a first end of said base;

a second end wall pivotally supported relative to said base adjacent a second end of said base;

said first and second end walls being foldable between a first position wherein said end walls are each positioned in an upright orientation and can be used to constrain motion of articles placed therebetween, and a second position in which said end walls are each folded down onto said base wherein the base and endwalls are dimensioned so that a generally planar surface formed by the endwalls is substantially co-planar with the floor of the cargo area; and at least one net disposed between and secured to said end walls for further assisting in supporting cargo disposed on said base when said end walls are disposed in said first position.

2. The cargo management system of claim 1, wherein said system is readily removable from said cargo area.

3. The cargo management system of claim 1, wherein at least one of said end walls comprises an extendable handle for further facilitating support of said articles when said end walls are disposed in said first position.

4. The cargo management system of claim 3, wherein each of said end walls includes an extendable handle for further facilitating support of said articles when said end walls are disposed in said first position.

5. The cargo management system of claim 1, wherein said system is removable from said cargo area;

wherein said base has an undersurface; and wherein said undersurface includes at least one cup holder.

6. The cargo management system of claim 5, wherein said cup holder comprises a recess formed in said undersurface.

7. The cargo management system of claim 1, further comprising a plurality of wheels disposed adjacent said base for enabling said base to be rolled along a ground surface.

8. The cargo management system of claim 1 wherein the cargo management system is readily removable from the cargo area so that it can be used to support articles placed on an undersurface of the base.

9. A collapsible cargo management system for a vehicle interior cargo area having a floor area, said cargo management system comprising:

a base configured to be supported by the floor area;

a first end wall pivotally secured to said base adjacent a first end of said base;

a second end wall pivotally secured to said base adjacent a second end of said base;

said end walls being movable between a first position, wherein said end walls extend generally perpendicular to said base for constraining motion of articles disposed on said base, and a second position wherein said end walls are folded down against said base;

wherein said system is readily removable from said cargo area; and at least one of said end walls including an extendable handle for further supporting cargo disposed on said base when said end walls are in said first position.

10. The cargo management system of claim 9, wherein said extendable handle is telescopically extendable from its said end wall.

11. The cargo management system of claim 9, wherein each of said end walls includes a handle; and wherein each of said handles is telescopically extendable.

12. The cargo management system of claim 9, further comprising at least one net secured to said end walls for further helping to support said articles.

13. The cargo management system of claim 9, wherein said base includes an undersurface; and wherein said undersurface includes at least one cup holder.

14. The cargo management system of claim 13, wherein said cup holder comprises a recess formed in said undersurface.

15. A vehicle comprising:

an interior cargo area having a floor with a recess;

a cargo management system including a base, a first end wall, and a second end wall, the base configured to be supported by a sub-floor of the recess, the first end wall pivotally supported relative to the base adjacent a first end of the base, and the second end wall pivotally supported relative to the base adjacent a second end of the base;

wherein the first and second end walls are movable between a first position in which the end walls are each positioned in an upright orientation and can be used to constrain motion of articles placed therebetween, and a second position in which the end walls each folded down wherein the base and endwalls are dimensioned so that a generally planar surface formed by the endwalls is substantially co-planar with the floor of the cargo area.

16. The cargo management system of claim 15 wherein the cargo management system is readily removable from the cargo area so that it can be used to support articles placed on an undersurface of the base.

17. The cargo management system of claim 15 wherein each of the end walls includes an extendable handle.

18. The cargo management system of claim 15, further comprising at least one net disposed between and secured to said end walls for further assisting in supporting cargo disposed on said base when said end walls are disposed in said first position.

19. The cargo management system of claim 15, wherein said system is removable from said cargo area;

wherein said base has an undersurface; and wherein said undersurface includes at least one cup holder comprising a recess formed in said undersurface.

20. The cargo management system of claim 15, further comprising a plurality of wheels disposed adjacent said base for enabling said base to be rolled along a ground surface.

* * * * *